United States Patent [19]
Rajagopal et al.

[11] Patent Number: 5,537,611
[45] Date of Patent: Jul. 16, 1996

[54] NETWORK MANAGEMENT OF SPECIAL SERVICE CALLS

[75] Inventors: Narayanasamy Rajagopal, Plano, Tex.; Elaine E. Reed, Vienna, Va.; Leo Mack, McKinney, Tex.; Jim Finucane; Louis G. Gottlieb, both of Colorado Springs, Colo.

[73] Assignee: MCI Communications Corporation, Washington, D.C.

[21] Appl. No.: 125,230

[22] Filed: Sep. 23, 1993

Related U.S. Application Data

[63] Continuation of Ser. No. 868,204, Apr. 14, 1992, abandoned.
[51] Int. Cl.$^6$ .......................... H04M 7/00; H04M 15/00; H04M 3/42
[52] U.S. Cl. .......................... 379/221; 379/113; 379/115; 379/134; 379/207
[58] Field of Search ...................................... 379/111, 112, 379/113, 133, 134, 210, 219, 220, 221, 265, 266, 309, 207, 115

[56] References Cited

U.S. PATENT DOCUMENTS

| | | | |
|---|---|---|---|
| 4,788,718 | 11/1988 | McNabb et al. | 379/113 |
| 5,068,892 | 11/1991 | Livanos | 379/113 X |
| 5,291,550 | 3/1994 | Levy et al. | 379/265 X |
| 5,335,268 | 8/1994 | Kelly, Jr. et al. | 379/112 |

OTHER PUBLICATIONS

Dunogue et al., "The Building of Intelligent Networks", Sotelec, Paris, France, 2nd Quarter, 1989, pp. 5–22.

Primary Examiner—Jeffery Hofsass
Assistant Examiner—Harry S. Hong

[57] ABSTRACT

In a telecommunication network, a DATA ACCESS POINT (DAP) database is used to route traffic between originating calling stations and terminating called stations for special service processing calls. The traffic or routing data are collected and converted by a traffic statistics processor into statistics data. The statistics data are provided to the management of the network. Some of the statistics data are converted by an INTEGRATED NETWORK MANAGEMENT SYSTEM (INMS) compiler processor into reports which may be provided to subscribers of the special call processing service in real time or on a delay basis. If a subscriber has subscribed to the special call processing service on a real time basis, he can update certain parameters of the database to reallocate the percentage of calls to be directed to the different called station staffed by his operators. All of the statistics data are fed to the network management which can update both the parameters in the database and those in the traffic statistics processor to thereby control the traffic data flow throughout the network. This ability to control the data traffic flow within the network allows the network management to implement effective traffic controls, as for example rerouting or blocking calls to certain subscribers who cause a congestion at a certain network switch to prevent other subscribers at that network switch from being affected by such congestion.

20 Claims, 13 Drawing Sheets

MCI-INMS OPERATIONS MANAGEMENT
CUSTOMER XYZ

5 MINUTE DAP STATISTICS FOR
800 NUMBER: 800-123-4567

09/12/91
10:30

| TIME INTERVAL | ATTEMPTS |
|---|---|
| 0920 - 0925 | 460 |
| 0925 - 0930 | 680 |
| 0930 - 0935 | 250 |
| 0935 - 0940 | 390 |
| 0940 - 0945 | 190 |
| 0945 - 0950 | 170 |
| 0950 - 0955 | 550 |
| 0955 - 1000 | 460 |
| 1000 - 1005 | 300 |
| 1005 - 1010 | 320 |
| 1010 - 1015 | 220 |
| 1015 - 1020 | 250 |
| TOTAL | 4240 |

MCI - INMS OPERATIONS MANAGEMENT
CUSTOMER NAME XYZ

5 MINUTE DAP STATISTICS FOR
MULTIPLE 800 NUMBERS
TERMINATING SWITCH/TRUNK
GROUP ADDRESS: 212-111-222-333

| TIME INTERVAL | 800-123-4567 | 800-123-4568 | 800-123-4569 | 900-987-6543 | TOTAL OF ALL CALL ATTEMPTS FOR THIS REPORT |
|---|---|---|---|---|---|
| 0920 - 0925 | 450 | 350 | 250 | 120 | 1170 |
| 0925 - 0930 | 650 | 230 | 275 | 150 | 1305 |
| 0930 - 0935 | 250 | 590 | 295 | 125 | 1260 |
| 0935 - 0940 | 400 | 640 | 220 | 180 | 1440 |
| 0940 - 0945 | 210 | 220 | 425 | 155 | 1010 |
| 0945 - 0950 | 175 | 600 | 480 | 175 | 1430 |
| 0950 - 0955 | 570 | 520 | 495 | 215 | 1800 |
| 0955 - 1000 | 480 | 420 | 550 | 195 | 1645 |
| 1000 - 1005 | 340 | 450 | 575 | 150 | 1515 |
| 1005 - 1010 | 370 | 355 | 625 | 160 | 1510 |
| 1010 - 1015 | 220 | 430 | 670 | 170 | 1490 |
| 1015 - 1020 | 290 | 475 | 750 | 185 | 1700 |
| TOTAL | 4405 | 5280 | 5610 | 1980 | 17275 |

MCI-INMS OPERATIONS MANAGEMENT
CUSTOMER XYZ

30 MINUTE CALL ATTEMPTS FOR AN
800 (900) NUMBER BY ORIGINATING NPA
DATE
800-123-4567

| TIME INTERVAL | ORIGINATING NPA | | | TOTAL OF ALL CALL ATTEMPTS FOR THIS REPORT |
|---|---|---|---|---|
| | 202 | 212 | 301 | |
| 0900-0930 | 180 | 300 | 450 | 930 |
| 0930-1000 | 170 | 220 | 400 | 790 |
| 1000-1030 | 160 | 220 | 420 | 800 |
| 1030-1100 | 155 | 300 | 580 | 1035 |
| 1100-1130 | 210 | 310 | 550 | 1070 |
| 1130-1200 | 250 | 305 | 450 | 1005 |
| 1200-1230 | 220 | 290 | 400 | 910 |
| 1230-1300 | 200 | 260 | 390 | 850 |
| TOTAL | 1545 | 2205 | 3640 | 7390 |

MCI-INMS OPERATIONS MANAGEMENT
CUSTOMER NAME

HOURLY CALL ATTEMPTS FOR AN
800 (900) NUMBER BY
ORIGINATING NPA

DATE
800-123-4567
NPAs: 202, 212, 301

NETWORK MANAGEMENT OF SPECIAL SERVICE CALLS

This application is a Continuation of patent application Ser. No. 868,204 filed Apr. 14, 1992, now abandoned.

FIELD OF THE INVENTION

The present invention relates to special service telephone call processing such as "800", "900" and "VNET" calls, and more particularly to the collection of traffic flow data between any calling station and any of a plurality of called stations within a public or private network so that private network and public network managers can optimally allocate the traffic flow pattern and distribution of calls to and within the telecommunication network.

BACKGROUND OF THE INVENTION

When a subscriber (customer) subscribes to a special service call processing service such as "800" or "900" (800/900), ENHANCED VOICE SERVICES (EVS), or VIRTUAL NETWORK (VNET) service in a telecommunication network, the subscriber needs to give an estimated forecast to the NETWORK MANAGEMENT CENTER (i.e. management of the network) of the special service's traffic. The management of the telecommunication network would then assign ports in the different network switches to which a called station (telephone(s) to answer the 800/900 calls) is associated. In other words, when someone calls the subscriber's 800/900 number, depending on the time of day, days of the week, etc., the call may be routed to one of a plurality of different called stations each of which may be associated with a different network switch in the telecommunication network. Thus, an 800/900 call made at 9 a.m. on Monday eastern standard time (EST) may be routed to a call station manned by operators of the subscriber in New York; whereas a call made to the same 800/900 number at 9 p.m. E.S.T. on the same day would be routed to a called station manned by operators of the subscriber at a network switch in San Francisco, for example.

In the instance where the subscriber has underestimated the traffic to his 800/900 number, for example at a certain time of day, there would be a heavy traffic load placed on a particular network switch as the volume of calls made to the subscriber's 800/900 number exceeds the capacity assigned to the subscriber at that network switch. Congestion at that network switch occurs as a result.

Since there are other called stations independent of the subscriber's call number connected to the same network switch, the congestion at the network switch, in addition to affecting calls made to the subscriber's call number, also affects the other subscribers by blocking some, if not all, of the calls directed to them. The traffic pattern of calls throughout the telecommunications network could also be affected since calls may have to be rerouted to other network switches.

In U.S. Pat. No. 4,788,718, the traffic data to a subscriber's 800 number is compiled into a summary report and provided to the subscriber so that he can update the call processing logic under his control to reallocate calls directed to the his 800 number to different destination network switches to reduce call blocking. Yet oftentimes the reallocation of calls to different destinations being left in the hands of the subscriber may lead to undesirable results, as for example when the subscriber could actually reallocate a congestion to another switch. Moreover, from the viewpoint of the management of the telecommunication network, the ability to manage the traffic flow of calls throughout the network, taking into account but independent of the reallocation ability of those subscribers who subscribed to the special call processing service, is particularly important inasmuch as the management wants the final say in determining the traffic flow pattern within the network. Furthermore, the management is also interested in obtaining an overall view of traffic data within the network for all of the special call processing numbers.

BRIEF DESCRIPTION OF THE PRESENT INVENTION

To provide traffic data to both the subscriber and the management of the network, the present invention system utilizes a DATA ACCESS POINT (DAP) database in which information relating to the different special service processing numbers are stored in conjunction with information relating to the subscribers who subscribe to the service, and translation tables that provide the data needed to translate a special service call number into a real call number associated with a particular network switch. Inside the DAP there are communication servers (CSs) and transaction servers (TSs) that provide, in response to a query from one of the network switches as to where a special service call should be routed, a response to that network switch specifying the switch and the real call number to which the special service call should be directed.

The system of the present invention further includes a processor connected to the DAP for collecting information from the DAP as traffic data for a given time interval. The processor, referred to as DAP TRAFFIC STATISTICS (DTS), converts the collected traffic data into statistics data and forwards the same to a compiler processor, which logically compiles the statistics data into reports. The compiler processor, referred to as the INTEGRATED NETWORK MANAGEMENT SYSTEM (INMS), could provide reports containing the compiled statistics data for a special service call processing number to the subscriber assigned that call number in either a real time or delayed basis. When sent to the subscriber in a real time basis, the subscriber could, using the statistics data, readjust the parameters for that call number to reallocate calls made to that call number to different destination called stations.

The management of the network can monitor the statistics data being sent out by the DTS to the INMS. The management of course monitors, in addition to a particular special service call number, the traffic statistics data of all of the special service calls throughout the network. Consequently, the management can reroute the traffic in the network to avoid congestion or call blocking caused by any one of the special service call numbers. Updating the parameters of the special service calls are effected in the DAP.

The system of the present invention accomplishes therefore the objective of providing the management of the telecommuni-cation network unprecedented visibility into the network so that traffic surges can be ascertained in real time and traffic controls may be implemented accordingly to alleviate any network congestions.

It is another objective of the present invention to provide traffic statistics data as reports to individual subscribers who subscribe to the special service call processing service provided by the network.

It is yet another objective of the present invention to provide to those subscribers who subscribe to the special service call processing service the ability to reroute calls made to his special service call number in a real time basis to more efficiently reallocate the incoming calls to different called stations.

It is yet a further objective of the present invention to provide traffic statistics data to a subscriber who subscribes to the special service call processing service to thereby enable the subscriber to have a better understanding of the different markets throughout the network.

BRIEF DESCRIPTION OF THE FIGURES

The above-mentioned objectives and advantages of the present invention will become more apparent and the invention itself will be best understood by reference to the following description of the invention taken in conjunction with the accompanying drawings, wherein:

FIG. 5 is an exemplar report illustrating a table of collected five minute DAP statistics for a particular special service 800 number;

FIG. 7 is an exemplar table report showing the call attempts for different 800/900 numbers for a shared termination during a given time period;

FIG. 10 is an exemplar table report showing call attempts to a 800 number by the originating Numbering Plan Area (NPA)

DETAILED DESCRIPTION OF THE PRESENT INVENTION

When subscribed to a special service such as 800/900 call processing in a telecommunication network, a subscriber (customer) is assigned a particular 800/900 number. Usually the subscriber of the 800/900 call number aims his goods or services to a nationwide market. Since telephone charges in most instances are dependent on the distance between a calling station and a called station, to effect an efficient operation and to allow greater availability due to time of day differences, the subscriber of the 800/900 number usually has answer stations, i.e. called stations, staffed by operators at different locations across the country.

The volume of calls to the different locations where the subscriber has called stations for receiving calls made to his 800/900 number is dependent on factors such as the size of the estimated market at the location, the perceived strength of the market, the time of day, the days of the week or month, etc. Thus, albeit callers may call the same 800/900 number from anywhere in the country, they may nonetheless be talking to different operators located at different called stations across the country.

To route a call made to a particular 800/900 number to a particular called station in the network, a DATA ACCESS POINT (DAP) database which has at least one translation table for translating the 800/900 number into the terminating address of the particular called station is used. The translation is based on information received from the calling station such as the dialed number coupled with additional information, for example the area code from which the call originates. Such DAP is shown in FIG. 1 as 8.

Figure 1:
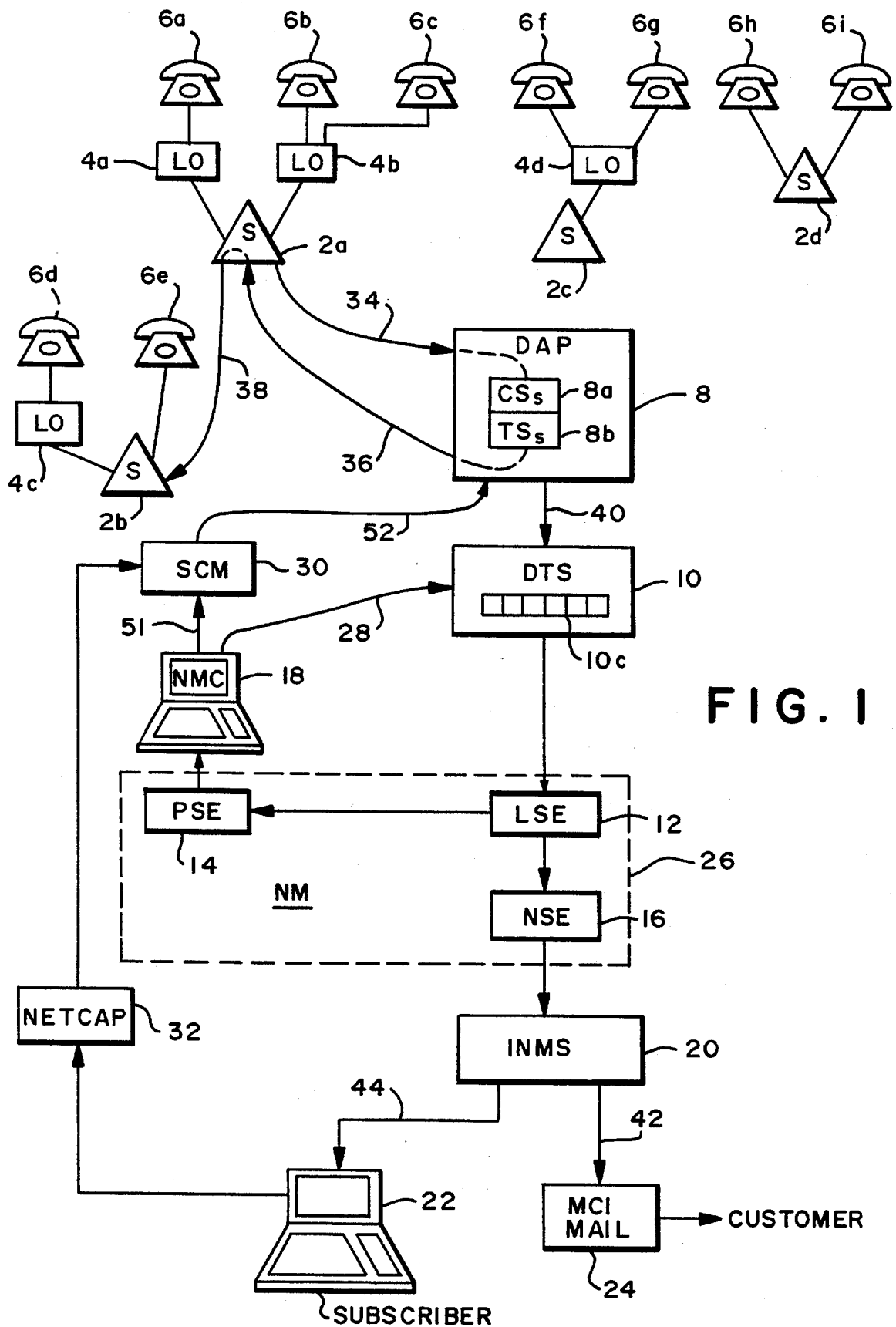
FIG. 1 is a block diagram representation of the present invention integrated into a telecommunication network.

By way of an overview, with reference to FIG. 1, a telecommunication network has a number of network switches of which only 2a–2d are shown. Each of the network switches may have connected thereto a local exchange office such as 4a and 4b connected to switch 2a, or a calling/called station, such as 6h and 6i to switch 2d. Local offices 4a–4d are operated by local telephone companies and are necessary in certain instances for the connection of calling/called stations to an Interexchange Carrier (IXC) switch.

In the network shown in FIG. 1, each of network switches 2a–2d is connected to a DAP 8. For the sake of clarity, connections from network switches 2b, 2c and 2d to DAP 8 are not shown.

In brief, DAP 8 is a database which is made up of a number of processors, for example several VAX 6410 computers made by the Digital Equipment Corporation (DEC). Within DAP 8 information relating to the subscribers who subscribe to call processing special services, and therefore having special call processing numbers such as "800", "900" or VIRTUAL NETWORK ("VNET") numbers, is stored. Also stored in DAP 8 are data relating to the different network switches, for example the area codes, i.e. Numbering Plan Area (NPA), to which each network switch is associated, or the Local Access Transport Areas (LATA) relating to the different network switches where calls originate. DAP 8 also has stored therein, among other information, data such as different supplementary codes, accounting codes and credit card numbers of subscribers of the network. A more detailed discussion of the different data stored in DAP 8 and how DAP 8 operates is given in co-pending application Ser. No. 485,308 fried Feb. 28, 1990 by Finucane et al., incorporated by reference herein to the disclosure of the instant invention.

Within DAP 8 are a plurality of communication servers (CSs) 8a and a plurality of transaction servers (TSs) 8b. Communication servers 8a and transaction servers 8b are processors from the VAX family of processors including MICROVAXES, 6410's, etc. Communication servers 8a and transaction servers 8b work cooperatively in handling requests (queries) sent to DAP 8 by the different network switches. Responses to the requests are sent back to the switches. Copies of the request/response message pairs can be forwarded to an adjunct processor such as the DAP TRAFFIC STATISTICS (DTS) processor 10.

For the present embodiment, DTS 10 is comprised of a collection of VAX processors. In essence, DTS 10 provides real-time statistics about utilization of the DAPs such as DAP 8, the Network facilities, and the services that the DAPs control. The statistics are broken out into categories that will assist Network Management personnel and subscribers in the management of the network and effective use of its services.

In particular, DTS 10 provides Network Management personnel with visibility into the network to detect traffic surges. This information allows them to determine immediately where to implement traffic controls in the event of network congestion.

DTS traffic statistics will be provided to individual 800, 900, and Enhance Voice System ("EVS") subscribers who subscribe to this service. The information may be accessible "real time", as it is provided to Network Management, or be summarized and provided per period of time, as for example per half hour. DTS information helps subscribing customers to effectively use their Command Routing and Routing Control features, which respectively allow the subscribers to immediately implement pre-set routing plans and modify existing routing plans.

To calculate the utilization statistics, DTS 10 is sent copies of message traffic (request/response message pairs) between the Switch Network and the DAPs for 800/900/ EVS and "VNET" service. The DAPs provide these messages to DTS 10 on a real-time basis as they are generated. DTS 10 analyzes the DAP messages, counts them for short time intervals (for example, one-minute intervals for thresholds at terminations, and five minute intervals for subscriber and network statistics), and sends the counts to Network Management for display and further distribution (e.g. for use by subscribing customers).

To achieve this end, DTS 10 provides counts of the number of call attempts requiring Network Control System (NCS) services. These counts do not indicate the number of call completions. Rather, they show:

1. How many times a number was dialed;
2. Where the call originated; and
3. Where the call was supposed to terminate.

The number of times a particular number is dialed is referenced, for the instant invention, as "peg counts". There are three types of count data produced by DTS 10 as a result. There are:

A. Subscriber Peg Counts;

B. Network Peg Counts; and

C. Traffic Congestion Alarms.

Subscriber peg counts include calls to an 800/900 number broken down by Terminating Address and Originating NPA. Subscriber peg counts are only supplied to those subscribers who have requested this service.

The four types of subscriber peg counts are:

A1. Five minute INMS Real Time;

A2. Five minute INMS Non-Real Time;

A3. Half-Hour Rollup; and

A4. Five minute Network Management.

INMS Real Time and Network Management peg counts are sent by DTS 10 within 15 seconds after the end of, for example, a five minute period. Non-Real Time and Rollup customer peg counts do not have a transmission time requirement. The only difference between INMS and Network Management peg counts is where they are forwarded by Network Management.

Network peg counts include "VNET", "800", "900" and Card calls. Network peg counts are used by Network Management personnel to pinpoint problems in the NCS Network, to determine trends, and to perform long term planning. Produced every five minutes, these peg counts are grouped by: the service type, the DAP transaction servers, the switches that originated the requests, and the terminating switch where the call to a Direct Access Line (DAL) termination will be sent.

Traffic Congestion Alarms are generated for calls to an 800/900 number which cause a problem at the terminating switch. There are two types of alarms:

1. Terminating address for a specific 800/900 number, and

2. Terminating address shared by several 800/900 numbers.

Traffic congestion alarms are produced when a number of calls are about to overwhelm a termination. These alarms inform Network Management that a new routing plan should be implemented by the customer or that DAP 8 should block a percentage of the calls. The alarms are based on thresholds that Network Management can set for each termination, or for a specific 800/900 number, at a termination. A threshold is a limit put on the number of calls that are sent to a termination during, for example, a one minute period. Thresholds are not set for terminations that normally do not have enough traffic to concern Network Management. Therefore, for those terminations a default threshold is used.

To collect the traffic statistics data from DAP 8, there is set up in DTS 10 two sets of counters—one active for counting and recording the statistics, the other passive for compiling the summarized statistics for the subscriber platform.

For the system level counters which are of significance to the management of the telecommunication network (and for which a more detailed discussion will be given later), there are three traffic data measurement groups:

Transaction Server (TS TM GROUP)

Originating Switch (ORIGSW TM GROUP)

Terminating Switch (TERMSW TM GROUP)

Both TS TM and ORIGSW TM groups have the following counters—the traffic data counted by a given counter being noted next to that counter.

800RES—Total "800" successful responses

800ERR—Total "800" failure responses

800BLK—Total "800" blocked calls due to DAP controls

900RES—Total "900" successful responses

900ERR—Total "900" failure responses

900BLK—Total "900" blocked calls due to DAP controls

VNETRES—Total "VNET" successful responses

VNETERR—Total "VNET" failure responses

MCCRES—Total Credit CARD successful responses

MCCERR—Total Credit CARD failure responses

DTOATT—Total DTO attempts

The TERMSW TM Group has the following counters.

800ATT—Total "800" attempts

800BLK—Total "800" blocked attempts*

900ATT—Total "900" attempts

900BLK—Total "900" blocked attempts*

VNETATT—"VNET" call attempts

* Blocked attempts due to DAP 800/900 controls.

The termination switch (TERMSW TM) counters provide information relating to the terminating switch, i.e. the network switch which the called station is connected to. As will be discussed in detail later, all of the data collected by the above-noted counters are provided to the management of the network.

There are counter groups established to record statistics of special service call processing numbers such as the "800", "900" or "VNET" numbers. For the present discussion, only counters relating to 800/900 numbers are described. These groups of 800/900 numbers are:

Subscribed customer 800/900 numbers

Non-subscribed customer 800/900 numbers

Network management 800/900 numbers

The group of counters for the subscribed customer 800/900 numbers are used by INMS to provide statistics to subscribers who subscribe to real time or non-real time statistics reports. A more detailed discussion of how INMS processor compiles information will be given later. In particular, the subscribed customer 800/900 number group has the following counters:

ATTERR—800/900 failure responses

ATTNPA—800/900 attempts from each NPA

ATTADD—800/900 attempts to each terminating address

ATTSHR—Shared termination totals

ATTBLK—800/900 blocked attempts due to DAP controls

More specifically, all subscriber data, whether in real or non-real time, are collected by DTS 10 in, for example, 5 minute intervals. The non-subscribed customer 800/900 counters are used for alarming purposes. For instance, when a threshold set in DTS 10 is exceeded for a predetermined period of time, for example 1 minute, the 800/900 counters will begin to collect the traffic data relating to the 800/900 number that caused the alarm and forward this data to the network management until such time as the number of call attempts of that 800/900 number falls below the threshold value. Do note that no counters are provided to count the total call attempts, since such is provided by the sum of the two counters. The number of total call attempts, along with any data collected in the counters, are forwarded to the network management in 5 minute intervals.

Since the network management does not know whether there are traffic surges caused by any of the special call processing services before the end of every 5 minute intervals, alarms are provided in DTS 10 to notify the network management when a specific threshold is exceeded for a given time, for example a 1 minute interval. These alarm messages indicate to the network management that there is/are congestion(s) of calls (or call blocking) in the network, most likely at different network switches.

There are the following alarm thresholds for a given time period:

Termination attempts

800/900 number attempts for a shared termination

For the alarm threshold on termination attempts, the time, the termination type, the termination address, five 1 minute counts (since the measurement of traffic data is assumed to be taken every 5 minutes) and the threshold value set for the alarm are required.

For the alarm on 800/900 number at the termination, the time, the particular 800/900 number, the termination type, the termination address, five 1 minute counts and the threshold level set for the 800/900 number termination alarm are needed.

The threshold values for the 1 minute statistics threshold alarms could be set anywhere from 1–65 k at increments of 1. Thus, when either of the thresholds is exceeded for the specified predetermined period of time, DTS 10 will forward an alarm message containing the threshold that is being exceeded to the network management. When the condition clears, a flag is set in DTS 10 so that an alarm clear message is sent to the network management to indicate that congestion no longer exists.

Having stored the traffic data, DTS 10 would transmit the following to either, or both, of the network management and the subscriber: system alarms are sent automatically to network management; traffic alarms, if exceeding the respective thresholds for 1 minute, are sent automatically to either the network management or the subscriber; system level statistics data are sent at the end of each measurement interval to the network management; statistics data which relate to the subscribers are sent to those subscriber who subscribe to INMS; 800/900 statistics data is sent to the network management upon request; and commands and responses from a presentation support element (PSE, which will be discussed later) are sent to the network management.

As should be realized, DTS 10 sends the system alarms spontaneously, i.e. anytime that a threshold is exceeded for a given time period. Further, the statistics data for network management and the more limited statistics data for the subscribers are sent at the end of every 5 minute intervals. The traffic alarms, if they occur, are forwarded every minute. Furthermore, as should be recognized, alarms have the highest priority in the telecommunication network.

In sum, therefore, DTS 10, upon receipt of traffic data from DAP 8, records each of the call attempts made from a calling station to a called station and collects traffic data at given time intervals, for example 5 minute intervals, by means of counters. DTS 10 then converts the collected traffic data into statistics data. DTS 10 further sets different alarm thresholds to automatically notify the subscribers who subscribe to INMS generated reports to notify them of congestion of calls made to their 800/900 numbers. DTS 10 also notifies the network management of any congestion in the network.

To monitor the goings on in DTS 10, a local support element (LSE) 12 is used. LSE 12 is a VAX processor whose function is to collect the statistics data at every 5 minute intervals. In essence, LSE 12 collects the statistics data (which relate to the different network elements, the switches DXCS, etc.) being sent out by DTS 10 and routes the same either to a presentation support element (PSE) 14 or a network support element (NSE) 16 in a format compatible therewith. PSE 14 is a processor that acts as a "pass through" station through which the statistics data are forwarded to NETWORK MANAGEMENT CENTER (NMC) 18 and presented to the personnel thereat so that the network management can adjust or update the parameters of DAP 8 and DTS 10. NSE 16 is an adapter processor which acts as a "pass through" conduit for collecting and passing the statistics data (relating only to the subscribers) from LSE 12 to INMS processor 20. LSE 12, PSC 14 and NSC 16 may be combined as indicated by dotted box 26 and referred to as network management (NM) 26.

Thus, DTS 10 provides threshold alarms to NM 26 when the traffic volumes for an 800/900 number at a termination or for several 800/900 numbers that share a termination exceed a threshold within a one minute period. For every five minutes during the time the traffic exceeds the threshold for a specific 800/900 number at a termination, DTS 10 would collect call origination peg counts for the 800/900 number and forwards them to NM 26. When the traffic volume falls below the threshold for a five minute interval, DTS 10 would send a congestion alleviation alarm to NM 26. If the 800/900 number is not an INMS or Network Management subscriber, then DTS 10 would stop collecting and sending the peg counts.

INMS 20 essentially is a compiler processor which takes the collected 5 minute interval statistics data from DTS 10 and converts the same into reports. These reports are either sent directly to the subscriber via terminal 22 on a substantially real time basis or via E mail 24 to the subscriber on a non-real time, for example an overnight delay, basis.

The management of the network, at NMC 18, oversees the traffic data flow throughout the network and controls the parameters in DTS 10 directly via connection 28. For example, NMC 18 can change the threshold set by DTS 10 from a given value to another. Alternatively, the counts at counters 10c of DTS 10 may also be changed to reflect the estimate by a subscriber of the number of calls directed to a particular 800/900 number during a given period of time.

To change the parameters in DAP 8, NMC 18 has to send its commands to a DAP SERVICE CONTROL MANAGER (SCM) 30, a processor whose job is to ensure that all DAPs in the telecommunication network have the same parameters. This is required since, instead of just one DAP such as 8 shown in FIG. 1, in actuality, a plurality of DAPs, for example 3, are present in the telecommunication network to provide flexibility, redundancy and efficiency for the network. Thus, SCM 30 makes sure that all of the data in every one of the DAPs in the network are updated at the same time and that the information in the DAPs is identical.

In sum, the User Interface at NMC 18 allows Network Management personnel to log onto DTS 10 and enter:

1. The 800/900 number to be monitored by Network Management;

2. The one minute threshold values for any shared termination;

3. The one minute threshold values for a specific 800/900 number at a termination;

4. The default threshold for all shared terminations, or 800/900 numbers at a termination, where a threshold has not been set; and 5. Any new Subscribers, 800/900 numbers, or terminations.

Of course, DTS 10 sends all of its system and application alarms to NM 26.

To provide compatibility between SCM 30 and the subscriber at 22, since SCM 30 operates under a VAX environment while the subscriber terminal at 22 most likely operates under an IBM environment, a network compatibility processor (NETCAP) 32 is interposed between SCM 30 and subscriber terminal 22. In essence, NETCAP 32 is an user interface and database which allows the subscriber at 22 to enter user commands and translate those commands to a language compatible with SCM 30. The parameters of the subscriber's 800/900 number may be altered by the subscriber at 22 such that calls made to that number may be reallocated to different network switches, and therefore to different called stations, at different geographic locations across the country to even out the loads among the different called stations.

With reference to FIG. 1 and the flow charts illustrated in FIGS. 2A to 2C, the present invention system of the telecommunication network operates as follows.

Assume a caller at calling station 6a dials an 800 number assigned to a subscriber. The 800 call is sent to local switch office 4a which recognizes that the call is an 800 special service call and accordingly sends the call to network switch 2a. At network switch 2a a query is made, as indicated by block 200 (FIG. 2A), from origination switch 2a via line 34 to DAP 8. The sending of the query from switch 2a to DAP 8 is represented by block 202. Once in DAP 8, the query is forwarded to one of the communication servers CSs 8a which then looks at the appropriate translation table stored in DAP 8 to find a corresponding called station, and the network switch to which the called station is associated with, to which the call from calling station 6a should be routed. As should be understood, DAP 8 has a number of translation tables each of which may correspond to one of the special service call numbers. For example, there may be a translation table for "800" numbers, one for "900" numbers and one for "VNET" numbers. Furthermore, there may be a credit card table in DAP 8 which contains information on whether or not to connect a call made with a credit card.

The method of matching a corresponding called station number, i.e. the termination address of the station, with the origination calling station, i.e. the origination address, based on where the origination calling station is located, the time of day and the day of week etc. is given in the above incorporated by reference '308 application and will not be further discussed herein. It should be noted, however, that a number of parameters, such as the supplementary codes, accounting codes, headers, addresses etc. are used in locating the corresponding called station. It should also be noted that the connection made to a certain called station may be dependent on the allocation of calls made to that station for a particular 800 number, the percentage allocation having been selected by the subscriber when he began his subscription to the 800 call service.

Once the call has been sent to DAP 8 and to a communication server 8a, DAP 8 determines the type of call number the special service call processing number is. See block 204. Thereafter, from the appropriate translation table the termination address of the corresponding called station is obtained at block 206. DAP 8, at block 280, then determines from information obtained from the query whether there are additional parameters which require answers. And by stepping through the different decision blocks 282–288, particular parameter(s) can be obtained and compared with those stored in DAP 8. For example, in block 282, the NPA or LATA of the origination switch is determined, if so requested. In block 284, codes such as the supplementary code or the accounting codes for the 800 number are obtained. In block 286, the subscriber call number and the percentage of allocation to the different called stations are determined for routing a call to a called station a certain percentage of the time. If the special call processing number is a 900 number, whether or not the call is to be charged to a credit card is determined in block 288. It should be noted that there are of course additional parameters (not of relevance to the instant invention) not listed in the flow chart but nonetheless exist in DAP 8.

Once DAP 8 has determined the called station to which the call made from calling station 6a is to be routed, a response is sent from one of the transaction servers TSs to origination switch 2a via line 36, as indicated in block 290. Thereafter, the logic processor in origination switch 2a routes the call to the desired termination switch, for example switch 2b via line 38, as indicated in block 292 shown in FIG. 2A. It should be noted that instead of a direct connection as represented by line 38, some conventional distributed routing apparatus not germane to this invention is used to interconnect the different network switches in the telecommunication network.

Figure 2A:
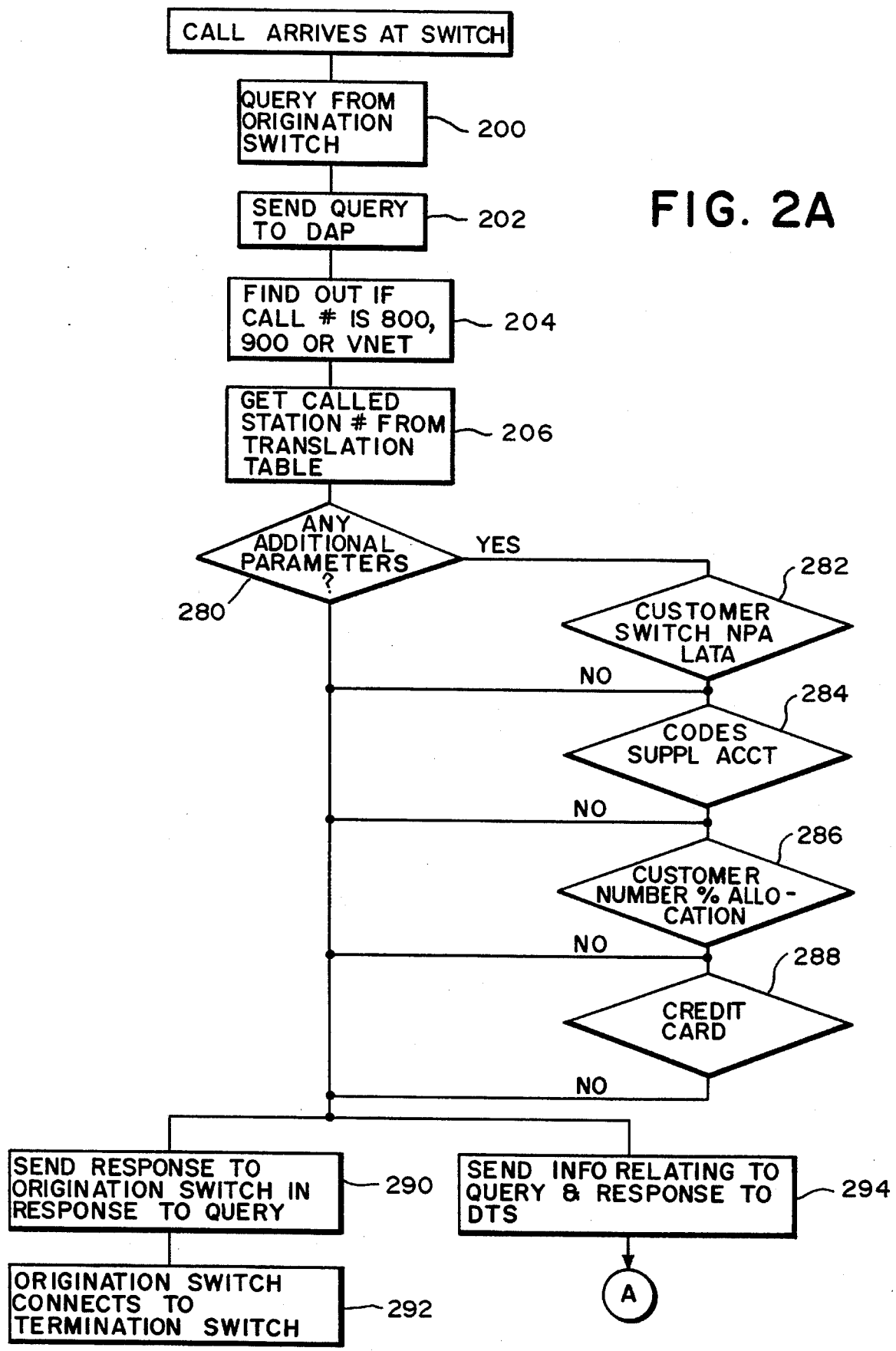
FIGS. 2A–2C, in combination, form a flow chart illustrating the operation of the present invention tele-communication network.
Figure 2B:
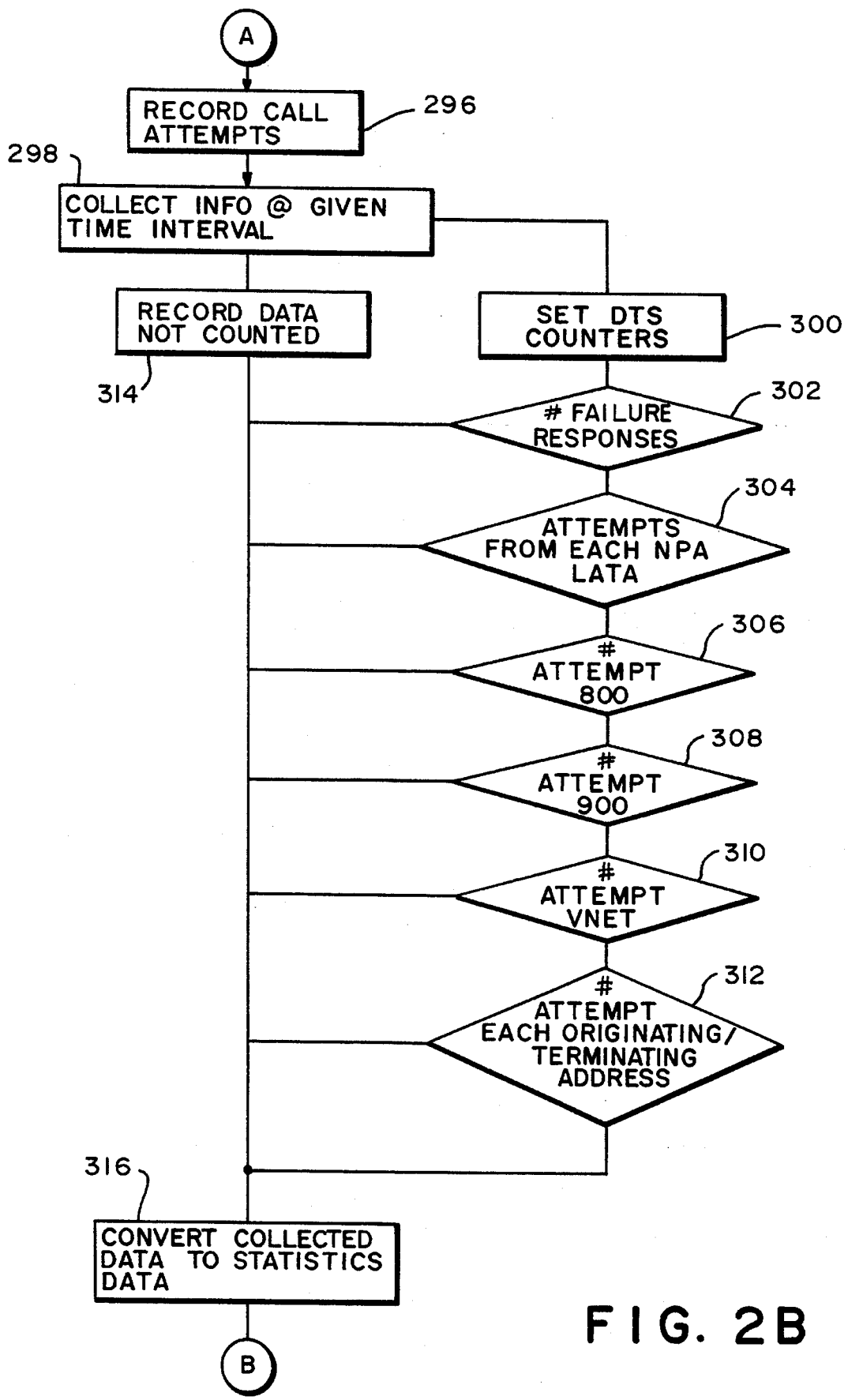

At or about the same time that an answer is provided to origination switch 2a, information extracted from the request and/or response is retrieved by or sent to DTS 10, as indicated by block 294 in FIG. 2A. DTS 10 records such call attempt from calling station 6a. In fact, all call attempts to the subscriber's number from any calling station are recorded by DTS 10, as indicated in block 296 of FIG. 2B. As was discussed earlier, the information output from DAP 8 via line 40 to DTS 10 is collected at repeated time intervals, for example at every 5 minute interval, as shown in block 298. The different counters 10c in DTS 10 are next set in block 300.

Some of the counters which may be included in counters 10c are shown in blocks 302 to 312. They include, for example, counters to count the number of failure responses, i.e. calls that do not get through to the call number, at block 302. In block 304 the number of attempts from each origination area, i.e. NPA or LATA, are counted. The different call attempts are separated into call attempts to 800 numbers in block 306, 900 numbers in block 308, or "VNET" numbers in block 310. The number of attempts from each origination address which represents a calling station and the terminating address which represents the called station to which a call was routed are recorded in block 312. As should be realized, additional counters may be added to DTS 10 when required.

Traffic data not counted by counters 10c are recorded in block 314. The thus recorded data, along with the data from each of the counters, are fed to block 316 where they are compiled and converted into statistics data by conventional methods. The statistics data are sent to LSE 12, at block 318. See FIG. 2C. From LSE 12 the statistics data are routed to NSE 16, at block 320, and PSE 14, at block 322.

NSE 16 makes sure the statistics data sent from LSE 12 are compatible with INMS 20. In block 322, the compatible statistics data are passed through to INMS 20. The thus received statistics data which represent traffic data collected for a given time interval are compiled by INMS 20 into reports in block 324. Whether a threshold is to be set/reset is determined in block 326. Any changing of a threshold at DTS 10 is determined in block 328. The compiled statistics report is sent to the subscriber in block 330, either via line 42 to E mail 24 or line 44 to terminal 22. Whether the report is to be sent on a real time or delayed time basis is determined in block 332. If it is to be sent via delayed E mail 24, this is done in block 334. From there the subscriber is sent a report, usually overnight, as indicated in block 336.

If the statistics report is to be sent to a subscriber on a real time basis, i.e. the subscriber having subscribed to the real time IMNS service, it is sent to the subscriber in block 338, via line 44 to customer terminal 22. There the subscriber, using the data contained in the report, can adjust the parameters stored in DAP 8 on a real time basis. Of course, if adjustment of the parameters is not required, the subscriber does not need to do anything. However, if parameters are to be adjusted, the subscriber would enter the updated parameters into terminal 22, as shown by block 340. To render the updated parameters compatible with DAP 8, the parameters are sent to NETCAP 32, where the parameters are converted into compatible VAX parameters. The VAX compatible data are next forwarded to SCM 30, as shown in block 344. Whether or not the parameters sent to SCM 30 require updating in DAP 8 is determined in block 346. If updating of parameters in DAP 8 is required, it is done in block 348.

In addition to forwarding the statistics data collected by DTS 10 to NSE 16 as indicated by block 320, the collected statistics data are also sent to PSE 14, as shown in block 322. From there the statistics data are forwarded to NMC 18 where the management of the telecommunication network monitors the traffic flow pattern within the network. The sending of data from PSE 14 to NMC 18 is indicated at block 346. Upon receiving the collected statistics data, a decision is made at NMC 18 on whether or not parameters need to be updated in DAP 8 at block 348. If they do, the to be updated parameters are sent to SCM 30 via line 51. Likewise, the determination of whether DTS 10 requires updating the information stored therein is determined in block 352. If updating is required, it is done in block 354.

Figure 2C:
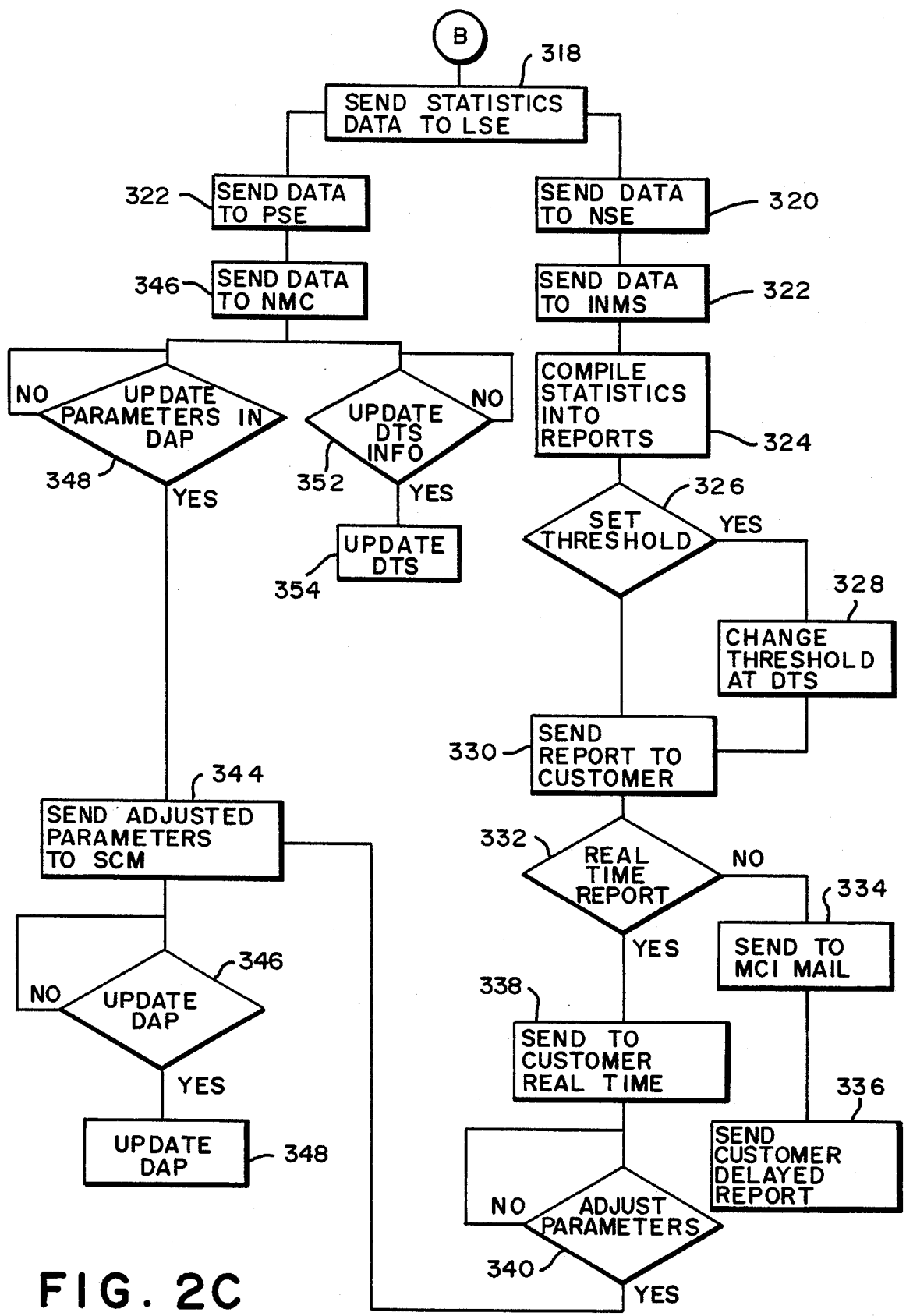
Figure 3:
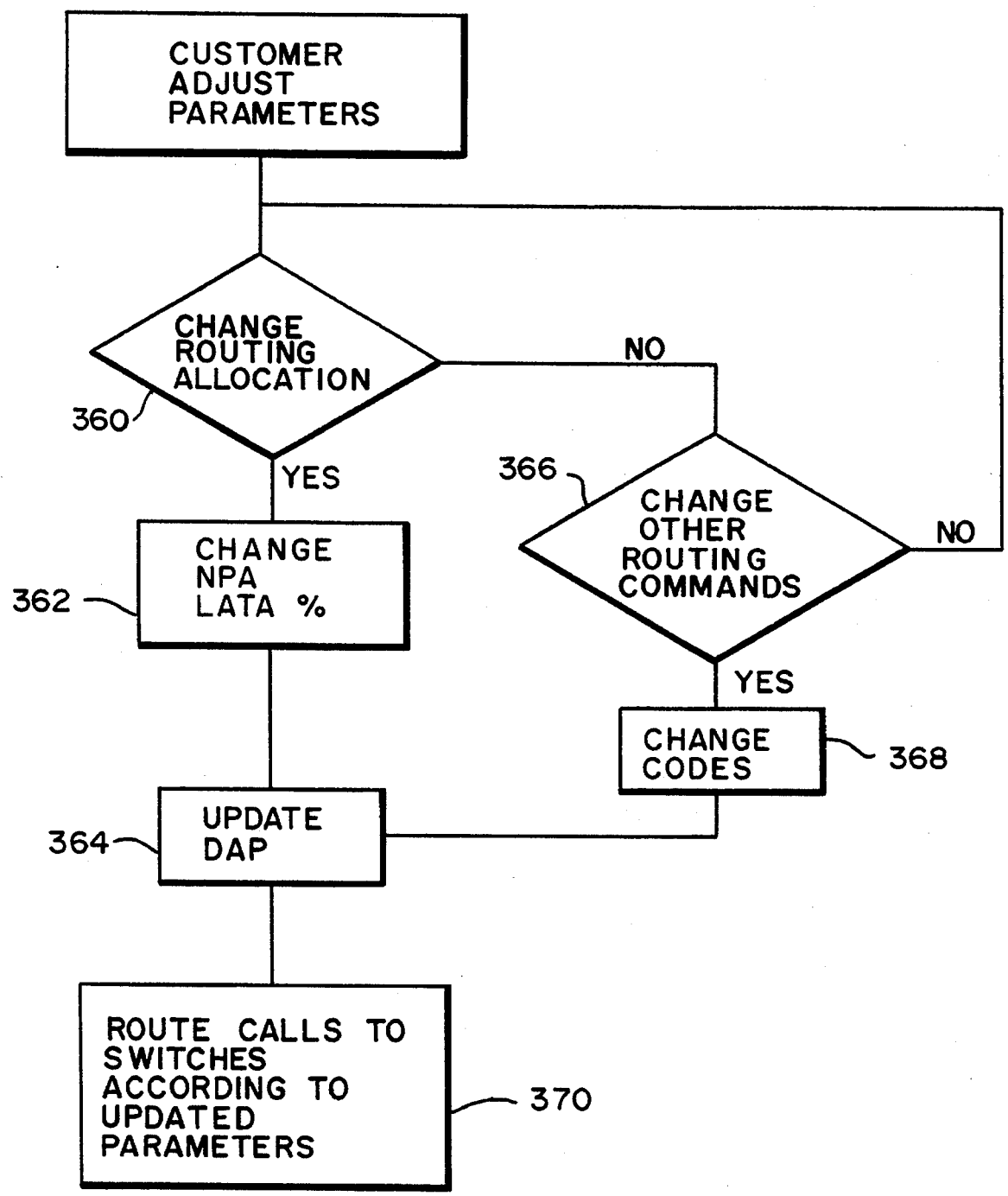
FIG. 3 is a representative flow chart illustrating how a subscriber of a special service call processing number can readjust parameters he controls to reallocate calls to the different network switches.

How a subscriber adjusts the parameters in DAP 8 is shown by the exemplar flow diagram of FIG. 3 which amplifies decision block 340 of FIG. 2C.

With reference to FIG. 3 a subscriber has to first determine whether reallocation of the percentage of calls to the different called station is needed in block 360. If it is, the percentage of calls to be sent to the different called stations, i.e. the NPAs or LATAs are changed in block 362. The changed percentage allocation is then updated in DAP 8 in block 364. If the allocation percentage does not need to be changed, the subscriber then has to determine in block 366 whether other routing commands need to be updated. If yes, the appropriate codes are changed in block 368. Thereafter, DAP 8 is updated with the changed codes in block 364. Calls made thereafter are routed to the different network switches according to the updated parameters, as shown in block 370.

Figure 4:
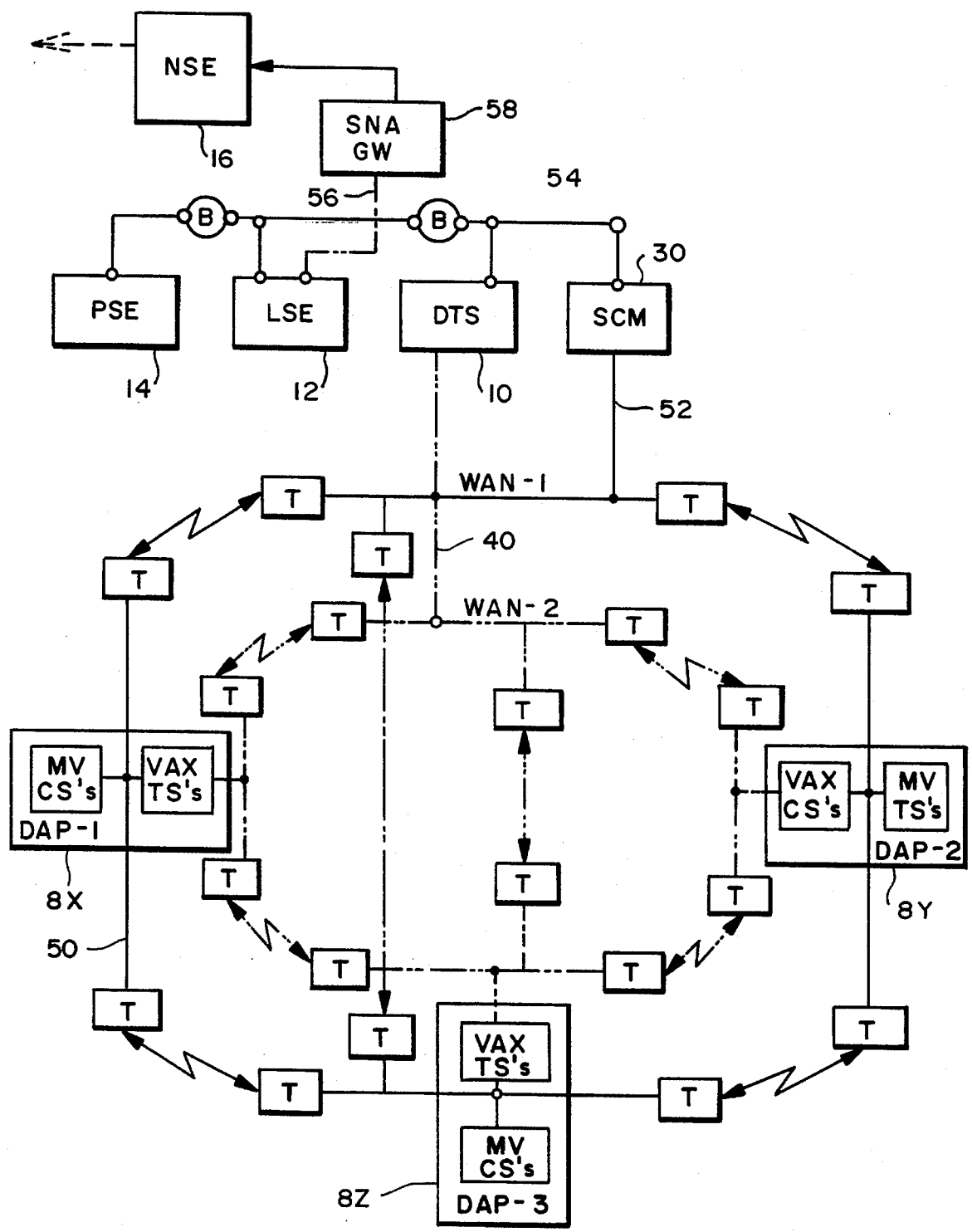
FIG. 4 is a second block diagram representation of the present invention in which a number of databases are connected by wide area networks (WANs)

FIG. 4 is block representation of a telecommunication network in which a number of DAPs 8X, 8Y and 8Z are shown to be connected to each other by two wide area networks WAN-1 and WAN-2. As was noted previously, for redundancy and efficiency, more than one DAP is provided. With redundant DAPs, even if one of the DAPs were to malfunction, there would still be backup information in the other DAPs. Efficiency arises because one of the DAPs may be located closer to a network switch of a calling/called station than the other DAPs.

As shown in FIG. 4, the WANs are connected to trans-LAN bridges T by a transmission line such as DECNET, designated 50. The trans-LAN bridge connection allows the DAPs, which are located at different geographic locations, to communicate with each other.

Although two WANs are shown in FIG. 4, the number of WANs is not important so long as each of the DAPs is capable of communicating with the other DAPs. Thus, for the illustration shown in FIG. 4, all of the switch traffic data, i.e. the switch requests and responses to and from the different switches, are collected at WAN-1. On the other hand, the network queues the information on WAN-2 so that the appropriate transaction server in one of the DAPs can pick up the information and act on it. It should be noted that each of the network switches is connected to one of the communication servers in the DAPs.

With regard to communications between the DAPs and SCM 30, NETCAP 32 and DTS 10, it should be noted that WAN-2 communicates with DTS 10 via line 40. Any updating of the DAPs by SCM 30 is effected through line 52 to WAN-1. Thus, any parameter updating sent by SCM 30 is effected equally in all of the DAPs. The operations of PSE 14, LSE 12, NSE 16 and NETCAP 30 have been discussed earlier and will not be repeated herein. Suffice it to say that SCM 30, DTS 10, LSE 12 and PSE 14 are connected together by a bridge network 54. Statistics data from DTS 10 being monitored by LSE 12 are fed via line 56 to a system network architecture protocol gateway (SNA GW) 58, before it is sent to NSC 16. SNA GW 58 is a communication box which provides a compatible gateway between LSE 12 and PSE 14.

With the present invention system as shown FIGS. 1 and 4, statistics data may be provided to the network management, at terminal 18, or to a subscriber, either on a real time basis at terminal 22 or a delayed basis by means of E mail.

By way of illustration, FIG. 5 shows a report of a subscriber XYZ's 800 number (800-123-4567) between the time period 9:20 to 10:20, with the time period being divided into 5 minute intervals. As shown, between 9:20 and 9:25, 460 call attempts were made to the call number; at 9:25–9:30, 680 call attempts; at 9:30 to 9:35, 250 call attempts, etc. The subscriber can glean from the report that between the hour 9:20 and 10:20 a total of 4,240 call attempts were made to his 800 number.

Figure 6:
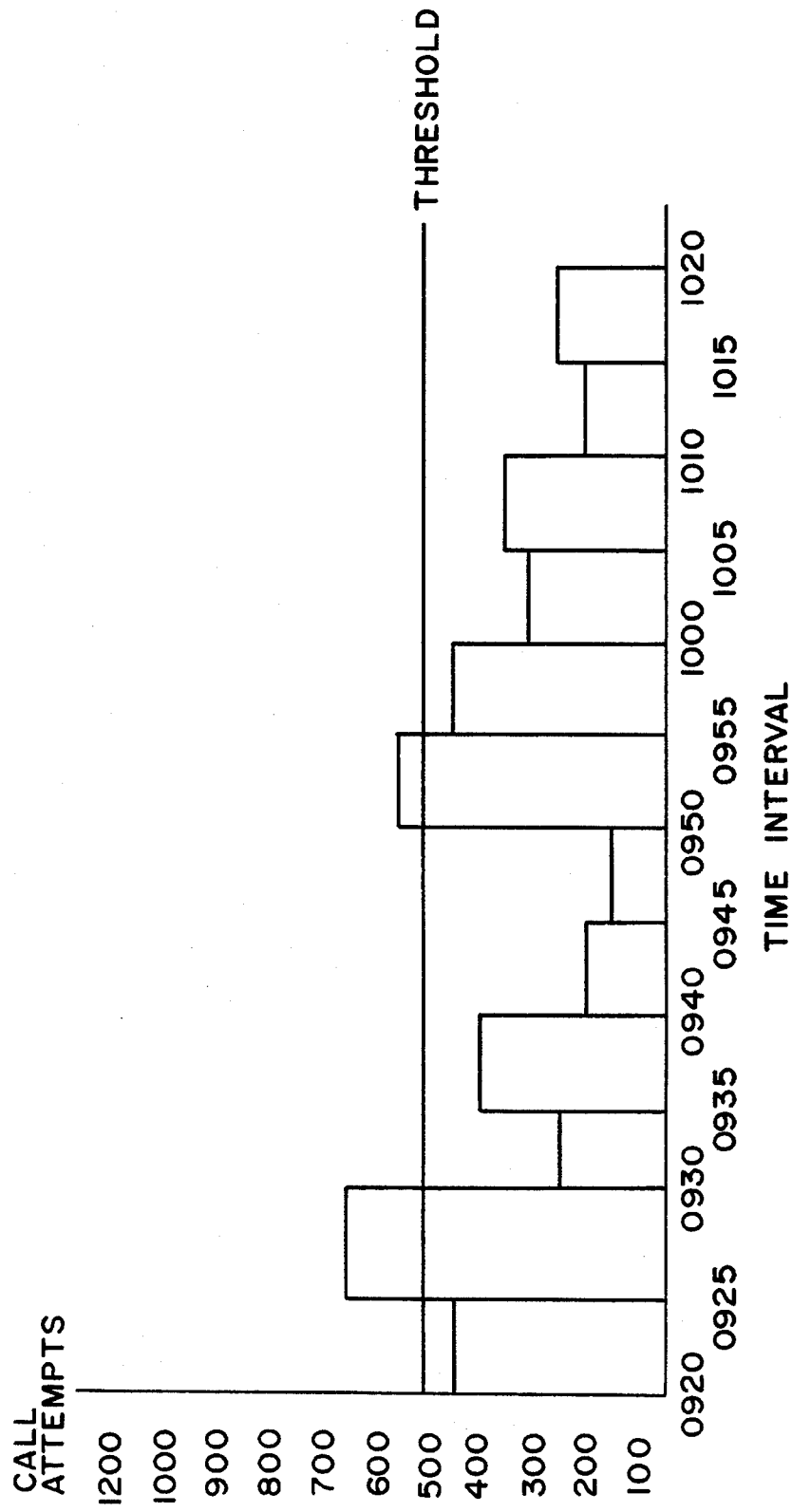
FIG. 6 is an exemplar report illustrating statistics data of FIG. 5 in a bar chart format.

FIG. 6 is another report provided to the same subscriber XYZ on the same 800 number but in a bar format. Here it can easily be seen that between time intervals 9:25–9:30 and 9:50–9:55, the threshold of 500 call attempts for a call period of 5 minutes was exceeded. Of course, if the threshold was exceeded for a period longer than the time preset for it, for example a preset period of 1 minute, an alarm would have been sent to the subscriber to warn him of congestion. And if the 500 call attempts threshold is continually being exceeded, a notice is sent by the management to the subscriber to require the latter to purchase a higher capacity in the network if he does not want to miss a substantial amount of calls, or so that he does not cause call blocking to other subscribers.

FIG. 7 is a report provided to the subscriber (and to the management since all statistics data are provided to the management of the network) wherein the statistics data for a terminating switch address for a given time period is shown. As illustrated, three 800 and one 900 numbers are provided at this network switch and a total of 17,275 call attempts were made to this network switch between 9:20 and 10:20. And based on the traffic data of the 800 number 800-123-4569, it appears that there was a substantial rise of call attempts to that number starting at the time interval 9:40 to 9:45. If a subscriber had run an advertisement (for example on TV or radio) proximate to that time, such report would provide a feedback to the subscriber of how successful his commercial is in marketing his product to the viewers, or listeners.

Figure 8:
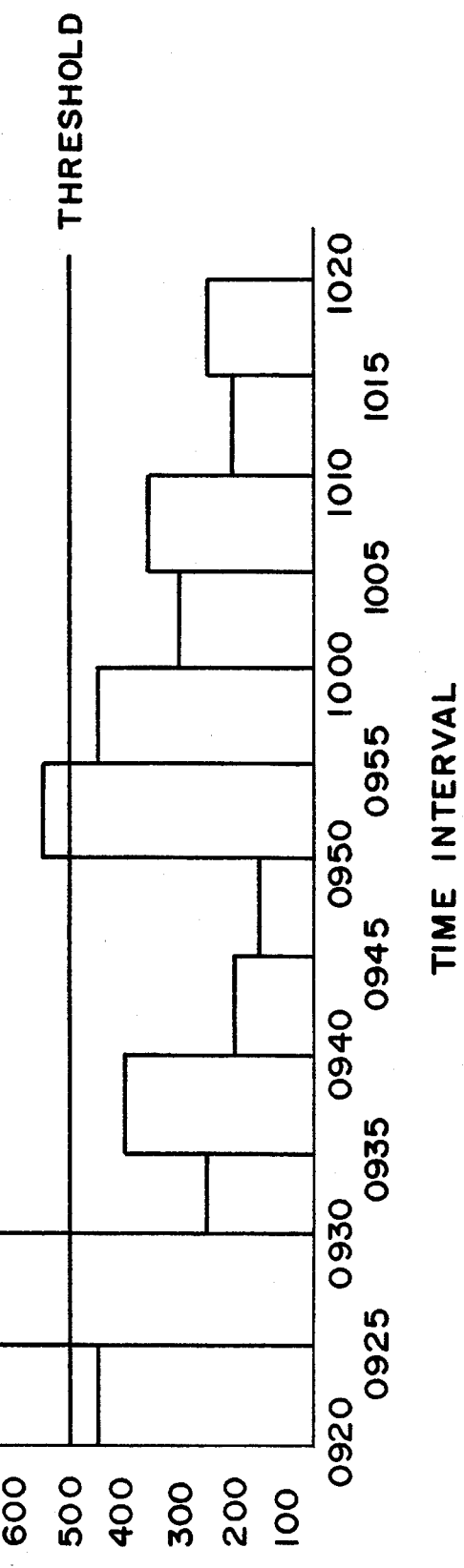
FIG. 8 is an exemplar bar chart report illustrating the number of call attempts at a particular terminating address for a single 800/900 call number.

FIG. 8 is a bar chart provided to the subscriber (and the network) of the number of calls directed to a terminating switch address.

Figure 9:
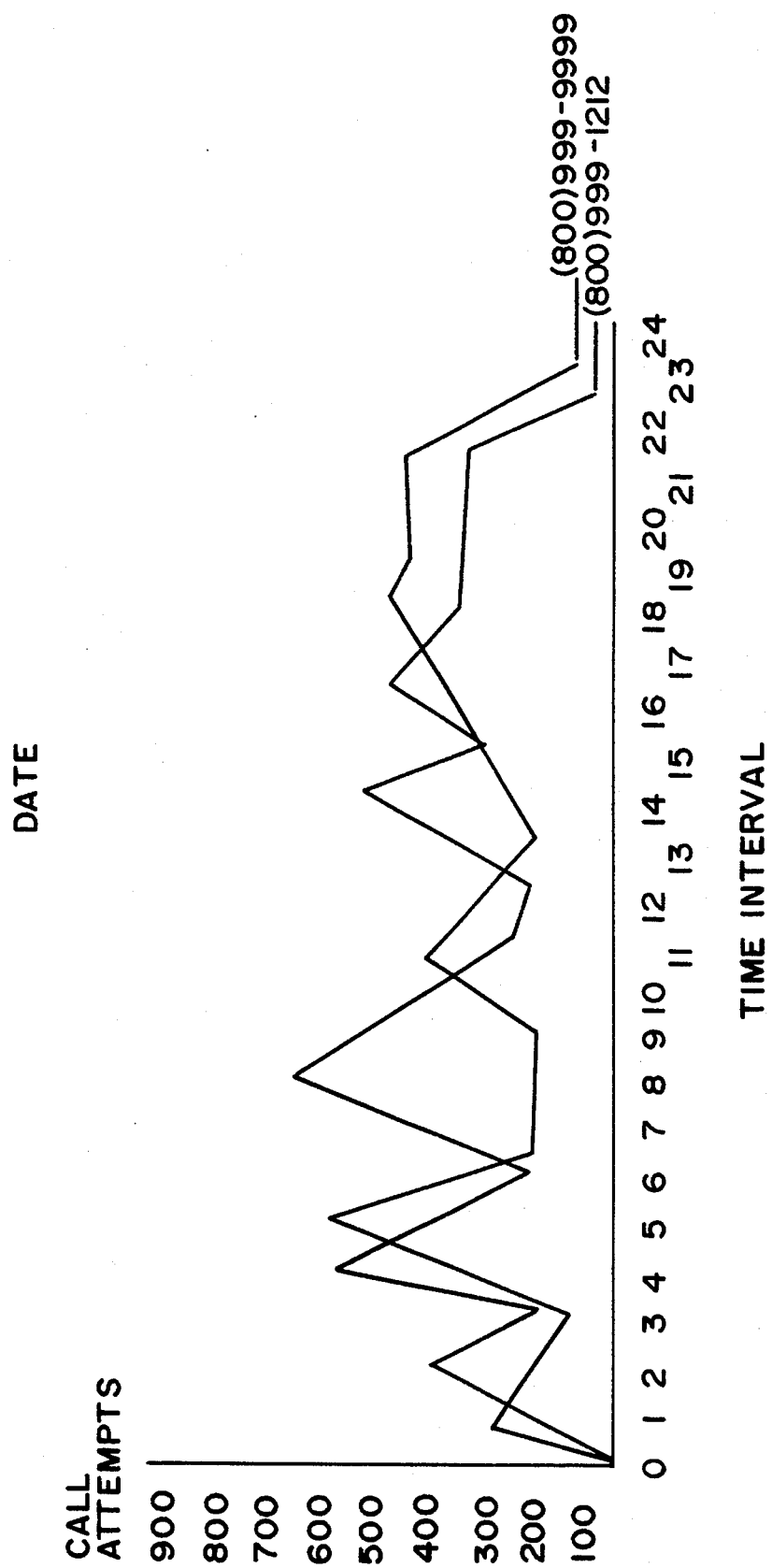
FIG. 9 is an exemplar chart report illustrating two different 800 numbers and the hourly call attempts to those numbers during a given time period.

FIG. 9 is a chart illustrating the number of call attempts for two 800 number made in a 24 hour time period.

FIG. 10 is a report provided to the subscriber which shows the number of calls directed to his 800 number from different area codes.

Figure 11:
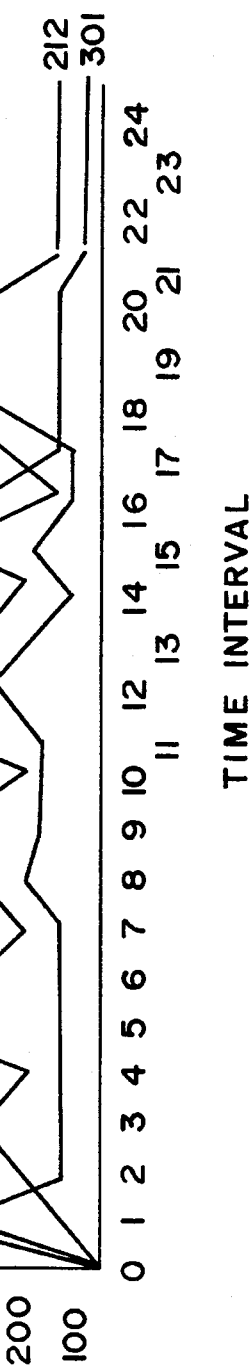
FIG. 11 is an exemplar chart report showing three different NPAs and the frequency of call attempts to each during a given time period.

FIG. 11 shows that the number of call attempts made from area code 301 is higher during the time period of intervals 0–17 than time intervals 17–24. On the other hand, call attempts made from area code 202 remains essentially flat between time intervals 2–17 but stays substantially high from then to the end of the time measuring period. Calls from area code 212 are erratic through time intervals 0–21 but stays flat from intervals 21–24.

With the information provided by the FIG. 11 report, a subscriber can readily reallocate the percentage of calls to be received by his called stations such that the called station closest to area code 301 is allocated a higher percentage of calls during time intervals 0–17 so as to reduce the amount of long distance charges. Further, to even out the traffic flow between time intervals 17–24, the subscriber could reallocate some of the calls from originating switch network 301 to another called station during intervals 0–17.

With the thus described reports, it should be apparent that the subscriber can change parameters in DAP 8 to reallocate the percentages of calls to be forwarded to the different called stations to smooth out the traffic flow for calls made to his call number. Likewise, the management of the network can adjust the different parameters of DAP 8 and the thresholds in DTS 10 to effect a substantially optimal traffic flow pattern for calls made to the different special call processing numbers to thereby prevent any call blocking in the different network switches. It should further be appreciated that not all of the statistics data collected and converted by DTS 10 are forwarded to subscribers, as there are some statistics data which are of interest only to the network management but of no significance (or should not be disclosed) to the subscribers. For example, data relating to all network switches are not of interest to a subscriber since chances are the subscriber does not have a called station in each of the network switches throughout the telecommunication network.

It should be appreciated that the shown example reports are but a small sample of available reports that can be generated by the present invention system. The nature and format of the reports are of course dependent on the type of request input by the subscribers and/or the network management.

Inasmuch as the present invention is subject to many variations, modifications, and changes in detail, it is intended that all matter described throughout this specification and shown in the accompanying drawings be interpreted as illustrative only and not in limiting sense. Accordingly, it is intended that the invention be limited only by the spirit and scope of the appended claims.

We claim:

1. A telecommunication network for providing message communications between any of a plurality of calling stations and any one called station of a plurality of called stations in said network corresponding to a call number assigned to a subscriber, said network including routing means for connecting said any calling station to said any one called station based on parameters relating to said call number selected by said subscriber and set by management of said network, comprising:

database means arranged to store information relating to said network including said parameters of said call number, identifiers and parameters of calling stations, called stations, call numbers and subscribers of said network, said database means further being arranged to collect and store traffic data generated by calls made between calling stations and called stations; and processing means for receiving from said database means traffic data based on all calls made between any of said calling stations and said any one called station for a predetermined period of time, said processing means further presenting said received traffic data as statistics data to said management and forwarding at least some of said statistics data to said subscriber of said call number so that said subscriber may take the forwarded statistics data into consideration to adjust said parameters of said call number to more efficiently regulate the traffic flow to said plurality of called stations from calls made to said call number and said management utilizing said statistics data and any adjusted parameters from said subscriber to regulate the flow of message communications throughout said network to effect a substantially optimal traffic flow pattern of calls in said network.

2. The network of claim 1, wherein said database means comprises:

traffic record means for recording as traffic data each call attempt from said any calling station to said call number, the number of times calls were made from any of said plurality of calling stations to said call number and the number of times a call was routed to one of said plurality of called stations corresponding to said call number, and the respective addresses of said any calling station from which at least one call attempt to said call number was made and said any called station to which a call to said call number was routed for said predetermined period of time.

3. The network of claim 2, wherein said traffic record means comprises:

counter means to count as additional traffic data the number of times certain events relating to calls made to said call number occurred in said predetermined period of time, said recorded and counted data in said traffic record means being output as said statistics data.

4. The network of claim 3, wherein said processing means further comprises:

compiler means for receiving from said traffic record means the statistics data collected therein for said predetermined period of time, and compiling at least some of said statistics data into reports to be provided to said subscriber in either real time or delayed basis.

5. The network of claim 4, wherein said processing means further comprises:

means for monitoring said traffic record means and forwarding said statistics data to said management and said compiler means.

6. The network of claim 4, further comprising:

means interfacing said processing means and said database means; said interface means accepting inputs from said management and said subscriber and utilizing said inputs to update the information stored in said database means.

7. The network of claim 3, wherein said traffic record means further comprises:

means for sending an alarm to said management if the traffic data recorded or counted by said traffic record means exceeds a preselected threshold for a given time interval.

8. In a telecommunication network wherein a call is placed from any one of a plurality of calling stations to a call number of a subscriber to reach any one of a plurality of called stations staffed by said subscriber to establish message communications between said one calling station and said one called station, said one called station being routed to answer the call in accordance with parameters selected by said subscriber and set by management of said network, said network comprising:

database means for storing information relating to said network including said parameters selected by said subscriber and set by said management, identifiers and parameters of calling stations, called stations, call numbers and subscribers of said network, said database means further being arranged to collect and store traffic data generated by all calls made between calling stations and called stations;

traffic record means for retrieving from said database means traffic data based on calls originated from any calling station to said call number for a predetermined period of time, and converting said traffic data into statistics data to be provided to said management; and means for compiling at least some of said statistics data into reports to be provided to said subscriber in substantially real time to enable said subscriber to inform said management to more efficiently allocate incoming calls to said call number among said plurality of called stations staffed by said subscriber;

wherein said management utilizes said statistics data as a feedback to regulate the flow of message communications throughout said network to reduce call blocking and effect a substantially optimal traffic flow pattern of calls in said network.

9. The network of claim 8, wherein said traffic record means comprises:

means for recording the number of call attempts from any calling station to said call number, the respective addresses of any calling station where at least one call to said call number was made and any called station to which at least one call to said call number was routed, and the number of calls routed to said any called station during said predetermined period of time as traffic data.

10. The network of claim 8, wherein said traffic record means further comprises:

counter means for counting the number of times certain events relating to calls made to said call number occurred in said predetermined period of time as additional traffic data.

11. The network of claim 10, wherein said counter means comprises:

first means for counting the number of failure responses to call attempts to said call number and determining the types of failures;

second means for counting the number of calls to said call number from each numbering plan area (NPA) to which one of said calling stations is associated with;

third means for counting the number of times calls were made to said call number from respective addresses of said calling stations;

fourth means for counting the number of times calls to said call number were routed to respective addresses of said called stations;

fifth means for counting the total number of call attempts to said call number.

12. The network of claim 8, wherein said call numbers stored in said database means include at least 800, 900 and VIRTUAL NETWORK (VNET) call numbers, and wherein said database means comprises:

translation means for said call numbers responsive to said selected parameters for providing correspondence between each of said respective call numbers with the address of at least one corresponding called station when a call is made to said each call number.

13. The network of claim 12, wherein said traffic record means further comprises;

other counter means for counting the number of call attempts made to each of the 800, 900 or VNET call numbers.

14. The network of claim 8, further comprising:

means for monitoring said traffic record means and forwarding said statistics data to said management and said compiler means.

15. The network of claim 8, further comprising:

interface means for accepting inputs from said management and said subscriber, and utilizing said inputs to update the information stored in said database means.

16. The network of claim 8, wherein said traffic record means further comprises:

means for sending an alarm to said management if the volume of said traffic data based on calls to said call number or to any one of said called stations of said call number exceeds at least one preselected threshold for a given time interval.

17. In a telecommunication network including a processor means and a data base having multiple call numbers and a plurality of subscribers, wherein a call is placed from any one of a plurality of calling stations to a call number of a subscriber to reach any one of a plurality of called stations staffed by said subscriber to establish message communications between said one calling station and said one called station, said processor means routing said one called station to answer the call in accordance with parameters selected by said subscriber and set by management of said network, a method wherein said processor means works cooperatively with said data base means to effect a more efficient traffic flow pattern of calls to said call number and in said network, comprising the steps of:

collecting from said network traffic data generated from calls made by any of said calling stations to said call number and message communications effected as a result of calls between any of said calling stations and any of said called stations for a predetermined period of time;

converting said collected traffic data into statistics data;

compiling at least some of said statistics data into reports;

providing said reports to said subscriber in substantially real time to enable said subscriber to adjust said selected parameters to thereby more efficiently allocate incoming calls to said call number among said plurality of called stations; and providing said statistics data and any adjusted parameters from said subscriber to said management to use as a feedback to regulate the flow of message communications throughout said network to reduce call blocking and effect a substantially optimal traffic flow pattern of calls in said network.

18. The method of claim 17, wherein said collecting step further comprises the steps of:

recording the number of calls from any calling station to said call number, the respective addresses of any calling station where at least one call to said call number was made and the number of calls made therefrom, and any called station to which at least one call to said call number was routed and the number of calls routed thereto during said predetermined period of time as traffic data; and counting the number of times certain events relating to calls made to said call number occurred in said predetermined period of time as additional traffic data.

19. The method of claim 17, further comprising the step of:

setting a threshold to send out an alarm if the volume of traffic data based on message communications to said call number or to any of said called stations relating to said call number exceeds said threshold for a given time interval.

20. The method of claim 17, further comprising the step of:

automatically reporting to management that rerouting is required when a preset threshold representative of a predetermined volume of data based on message communications to said call number or to any of said called stations relating to said call number is exceeded.

* * * * *